United States Patent [19]
Westling

[11] 4,036,147
[45] July 19, 1977

[54] RAPID TRANSIT SYSTEM

[76] Inventor: Wayne A. Westling, 1530 21st St., Manhatten Beach, Calif. 90266

[21] Appl. No.: 698,940

[22] Filed: June 23, 1976

Related U.S. Application Data

[63] Continuation of Ser. No. 562,831, March 28, 1975, abandoned.

[51] Int. Cl.² .............................................. B64F 3/02
[52] U.S. Cl. ................................ 104/23 R; 104/107; 104/118; 191/34
[58] Field of Search ................ 104/22, 23 R, 23 FS, 104/106, 107, 109, 118; 191/29 R, 34, 63

[56] References Cited
U.S. PATENT DOCUMENTS

| | | | |
|---|---|---|---|
| 450,613 | 4/1891 | Culver | 191/34 |
| 575,615 | 1/1897 | Osyor | 191/34 |
| 1,733,069 | 10/1929 | Naud et al. | 191/29 X |
| 1,733,270 | 10/1929 | Messer | 104/23 R X |
| 1,811,270 | 6/1931 | Henderson | 104/106 |
| 2,404,376 | 7/1946 | Henderson | 191/34 X |
| 3,715,991 | 2/1973 | Boyd | 104/23 R |

Primary Examiner—Robert J. Spar
Assistant Examiner—Randolph A. Reese
Attorney, Agent, or Firm—Keith D. Beecher

[57] ABSTRACT

A transit system for urban and inter-urban use is provided which comprises a plurality of electrically energized helicopters which are tethered to and powered from a pair of rails. The rails are supported in a track structure which is constructed to extend above the normal traffic on the streets and roadways. Power is supplied to each helicopter through a flexible cable which also serves to tether the helicopter to the track and which allows the helicopter a measure of vertical and horizontal movement. The cable is supported on a trolley which moves along the track, and the cable is retractable, so that it moves in and out of the helicopter, or trolley, as the helicopter is maneuvered.

1 Claim, 2 Drawing Figures

RAPID TRANSIT SYSTEM

This application is a continuation of copending application Ser. No. 562,831, filed Mar. 28, 1975 now abandoned.

BACKGROUND OF THE INVENTION

The transit system of the invention is intended to overcome pollution and traffic congestion problems, and to provide a safe and efficient mass transport means. The helicopters in the system travel at relatively high speeds above the normal traffic. The system has the advantage in that construction and land acquisition costs are relatively low. Embarkation and debarkation stations may be constructed on the same level as the rails in much the same manner as present day elevated railway stations. The helicopters in the system, since they run on electric motors, have a minimum of drive mchanism on board, so that they are capable of carrying many more passengers than present day helicopters. Switching from one track to another is relatively simple. The rail and track structure is light and inexpensive since it is not required to support any substantial weight.

DETAILED DESCRIPTION OF THE ILLUSTRATED EMBODIMENT

Figure 1:
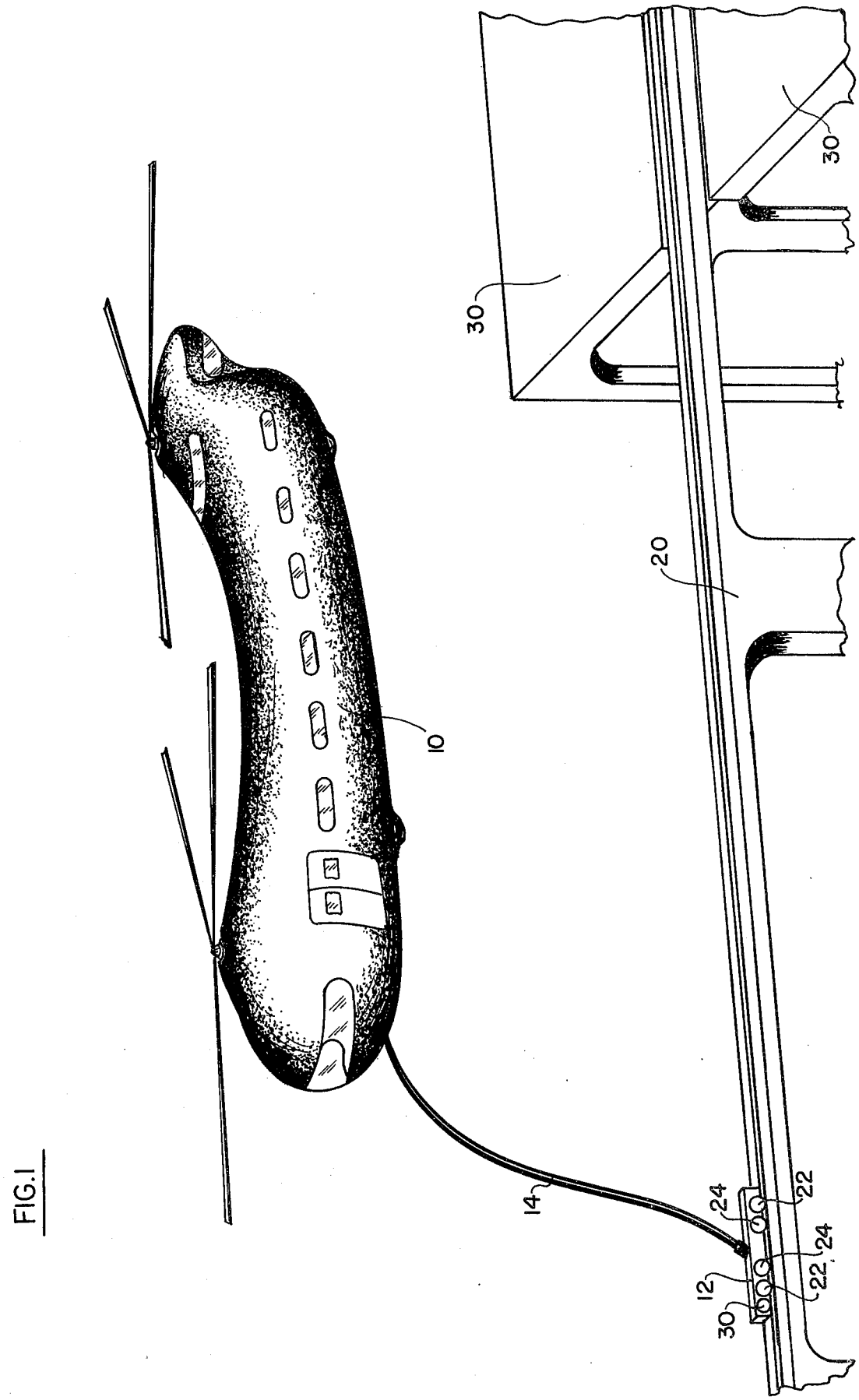
FIG. 1 is a schematic representation of a helicopter and associated track system in accordance with the invention.

The system of the invention is intended to include a plurality of electrically energized helicopters, such as the helicopter 10, each of which is tethered to a corresponding trolley 12 by means of an electric cable 14. The electric cable is retractably mounted in the rear end of the helicopter, so that the cable moves in and out as the helicopter is maneuvered.

The trolley 12 moves along a pair of rails 16 and 18 (FIG. 2) on an elevated track structure 20, the rails being mounted a particular distance, for example, approximately 40 feet, above the ground and normal ground traffic.

Figure 2:
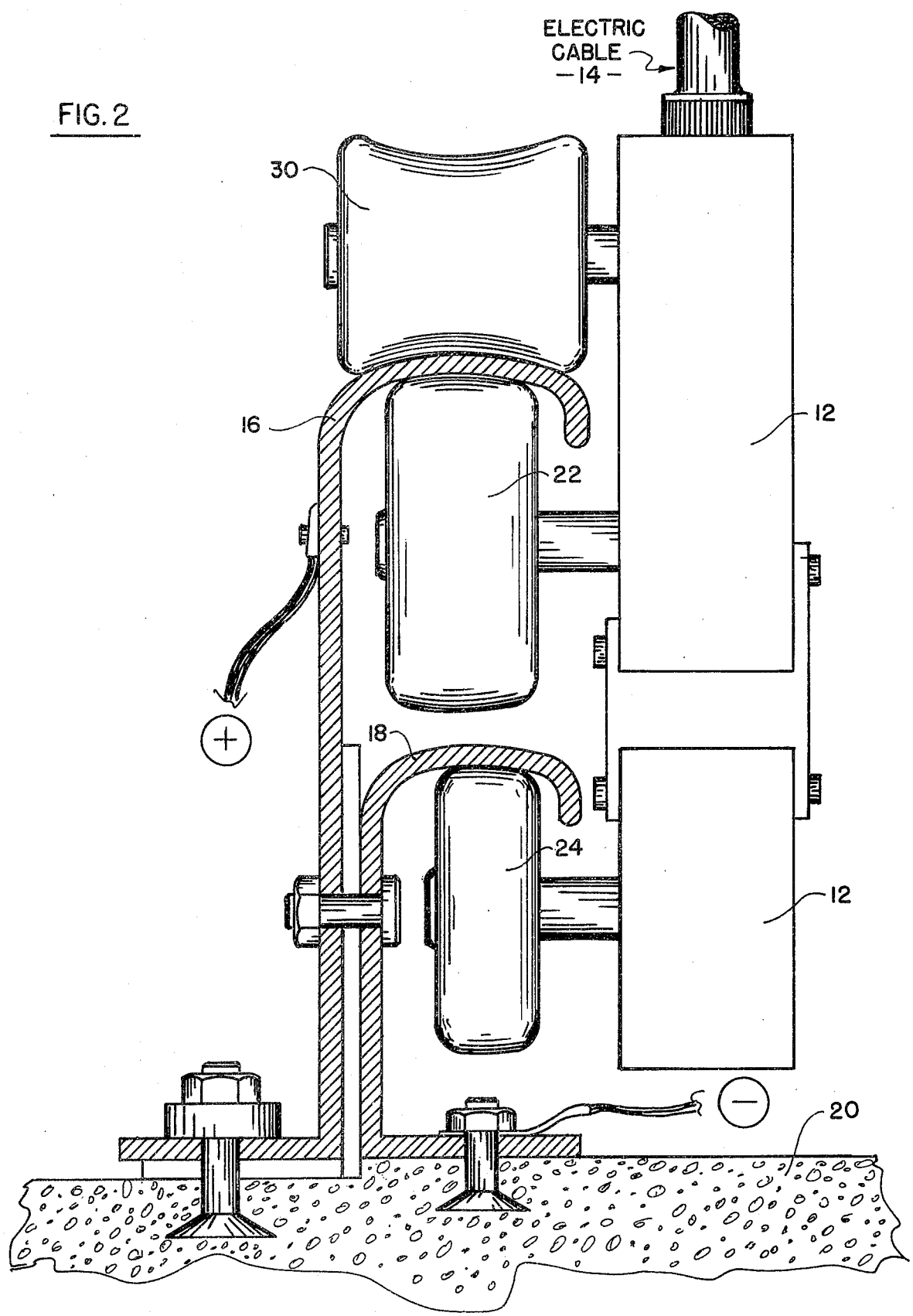
FIG. 2 is an enlarged representation of an appropriate trolley for movement along the rails of the track, to which the helicopter is tethered through an appropriate electric cable.

As shown in FIG. 2, the trolley 12 has a first pair of wheels 22 which roll along the rail 16, and a second pair of wheels 24 which roll along the rail 18. An electric voltage is applied across the rails 16 and 18, so that the cable 14 may supply appropriate electric power to the motors in the helicopter 10. The trolley includes a further wheel 30 which supports it on the top rail 16.

It is evident that the trolley 12 may take various configurations, and may roll or slide along the rails. Also, the cable 14 may be retractable into the trolley, if so desired, by mounting it on a spring-loaded reel on the trolley, or, as mentioned above, it may be retractable into the rear end of the helicopter by mounting it on a spring-loaded reel in the helicopter. The rails 16 and 18 also may be constructed to have a variety of configurations. The track structure 20 may be formed of cement, and may be of an appropriate shape to support the rails.

Stations and landing pads for the helicopter, such as the landing pad 30, may be built alongside the elevated track structure 20 at selected intervals.

The invention provides, therefore, an efficient and economical mass transport system which is relatively inexpensive in its construction, since it is guided by a track system which is not required to support any material weight, and which does not emit pollutants into the atmosphere, since it involves helicopters powered by electric engines.

While a particular embodiment of the invention has been shown and described, modifications may be made. It is intended in the claims to cover the modifications which fall within the spirit and scope of the invention.

What is claimed is:

1. A transit system comprising: an elongated structure mounted at an elevation above the ground and including a pair of spaced parallel electrically energized rails electrically insulated from one another; a trolley positioned on said structure for movement along the rails and including a first wheel engaging one of the rails and a second wheel insulated from the first wheel and engaging the other of said rails; an electrically energized aircraft of the helicopter type; and a retractable electric cable extending from the trolley to the aircraft and electrically connected to the first and second wheels to supply electric power to the motors of the aircraft and constituting the sole coupling between the elongated structure and the aircraft, in which the rails are positioned one above the other, in which the first and second wheels respectively engage the under surfaces of the rails, and in which the trolley includes a third wheel which engages the upper surface of the upper rail.

* * * * *